United States Patent
Rofougaran et al.

(10) Patent No.: US 11,700,585 B2
(45) Date of Patent: *Jul. 11, 2023

(54) 5G SIGNALS DETECTION USING NEURAL NETWORK

(71) Applicant: Movandi Corporation, Irvine, CA (US)

(72) Inventors: Ahmadreza Rofougaran, Newport Beach, CA (US); Sam Gharavi, Irvine, CA (US); Xianfu Liu, Irvine, CA (US); Qiyue Zou, Elk Grove, CA (US)

(73) Assignee: Movandi Corporation, Irvine, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 17/246,800

(22) Filed: May 3, 2021

(65) Prior Publication Data

US 2021/0258899 A1 Aug. 19, 2021

Related U.S. Application Data

(63) Continuation of application No. 16/571,840, filed on Sep. 16, 2019, now Pat. No. 11,026,198.

(51) Int. Cl.
*H04W 16/28* (2009.01)
*G06N 3/084* (2023.01)
(Continued)

(52) U.S. Cl.
CPC .......... *H04W 56/001* (2013.01); *G06N 3/045* (2023.01); *G06N 3/084* (2013.01);
(Continued)

(58) Field of Classification Search
CPC ... H04W 76/11; H04W 16/28; H04W 56/001; H04W 24/08; H04B 17/318; G06N 3/0454; G06N 3/0445; G06N 3/08
See application file for complete search history.

(56) References Cited

U.S. PATENT DOCUMENTS

| | | | |
|---|---|---|---|
| 11,228,379 B1 * | 1/2022 | O'Shea | H04B 17/3912 |
| 2018/0308013 A1 * | 10/2018 | O'Shea | G06N 3/086 |
| 2020/0143279 A1 * | 5/2020 | West | G06N 3/0472 |

OTHER PUBLICATIONS

M. Chen, U. Challita, W. Saad, C. Yin and M. Debbah, "Artificial Neural Networks-Based Machine Learning for Wireless Networks: A Tutorial," in IEEE Communications Surveys & Tutorials, vol. 21, No. 4, pp. 3039-3071, Fourthquarter 2019, doi: 10.1109/COMST.2019.2926625. (Year: 2019).*

(Continued)

*Primary Examiner* — Gary Mui

(74) *Attorney, Agent, or Firm* — Chip Law Group

(57) ABSTRACT

A communication system that includes neural network system configured to learn from training examples of radio frequency (RF) signals, and circuitry configured to label a first set of fifth generation (5G) RF signals originated from a first type of source and a second set of 5G RF signals originated from a second type of source. At least one RF impairment is added randomly to each labelled example of the first set of 5G RF signals and the second set of 5G RF signals, wherein randomization of artificially added RF impairment to each labeled example corresponds to addition of different RF impairments randomly to different labeled examples. The neural network system is trained with a plurality of labelled examples. Each labelled example includes an artificially added RF impairment. The circuitry uses the trained neural network system to detect an input 5G RF signal having a new RF impairment.

20 Claims, 5 Drawing Sheets

(51) Int. Cl.
*H04W 76/11* (2018.01)
*H04W 24/10* (2009.01)
*G06N 3/045* (2023.01)
*H04W 56/00* (2009.01)
*H04B 17/318* (2015.01)

(52) U.S. Cl.
CPC .......... *H04B 17/318* (2015.01); *H04W 16/28* (2013.01); *H04W 24/10* (2013.01); *H04W 76/11* (2018.02)

(56) References Cited

OTHER PUBLICATIONS

Abdullah et al., "Anomaly Detection and Classification in Cellular Networks Using Automatic Labeling Technique for Applying Supervised Learning," Procardia Computer Science, 140 (2018, pp. 186-195.
Margolin et al., "Using Machine Learning to Detect Noisy Neighbors in 5G Networks," Oct. 24, 2016 (Year: 2016).
Notice of Allowance for U.S. Appl. No. 16/571,840 dated Jan. 29, 2021.
Xiang et al., "Research on Distributed 5G Signal Coverage Detection Algorithm Based on PSO-BP-Kriging," Sensors 2018, 18, 4390. (Year: 2018).

* cited by examiner

5G SIGNALS DETECTION USING NEURAL NETWORK

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 16/571,840, filed on Sep. 16, 2019.

The above referenced Application is hereby incorporated herein by reference in its entirety.

FIELD OF TECHNOLOGY

Certain embodiments of the disclosure relate to a wireless telecommunication system. More specifically, certain embodiments of the disclosure relate to a communication system and method for high sensitivity 5th generation (5G) signals detection using a neural network.

BACKGROUND 5G is the next generation of wireless telecommunication technology that delivers much faster data rate as compared to long term evolution (LTE or 4G) technology. Currently, there are two solutions proposed for 5G networks, known as Non-Standalone (NSA) and standalone (SA). Both solutions are flexible to support a much wider range of frequency bands from sub-6 GHz to millimeter wave (mmWave) bands. The development of methods and systems to design and develop 5G modem (5G chip) are still at various stages of research and development for practical applications. Currently, exorbitant cost and immense time is involved in developing a conventional 5G wireless modem or even a conventional partial 5G modem, using traditional methods of developing 5G modems. For example, it may take months to a year to develop 5G wireless modem using traditional methods and systems, which is not desirable. Moreover, the conventional 5G modems are still not very sensitive to 5G signals due to various environmental conditions, presence of noise in radio frequency signals, and partly due to the wider range of frequency bands in 5G.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A communication system and method for high sensitivity 5th generation (5G) signals detection using a neural network, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
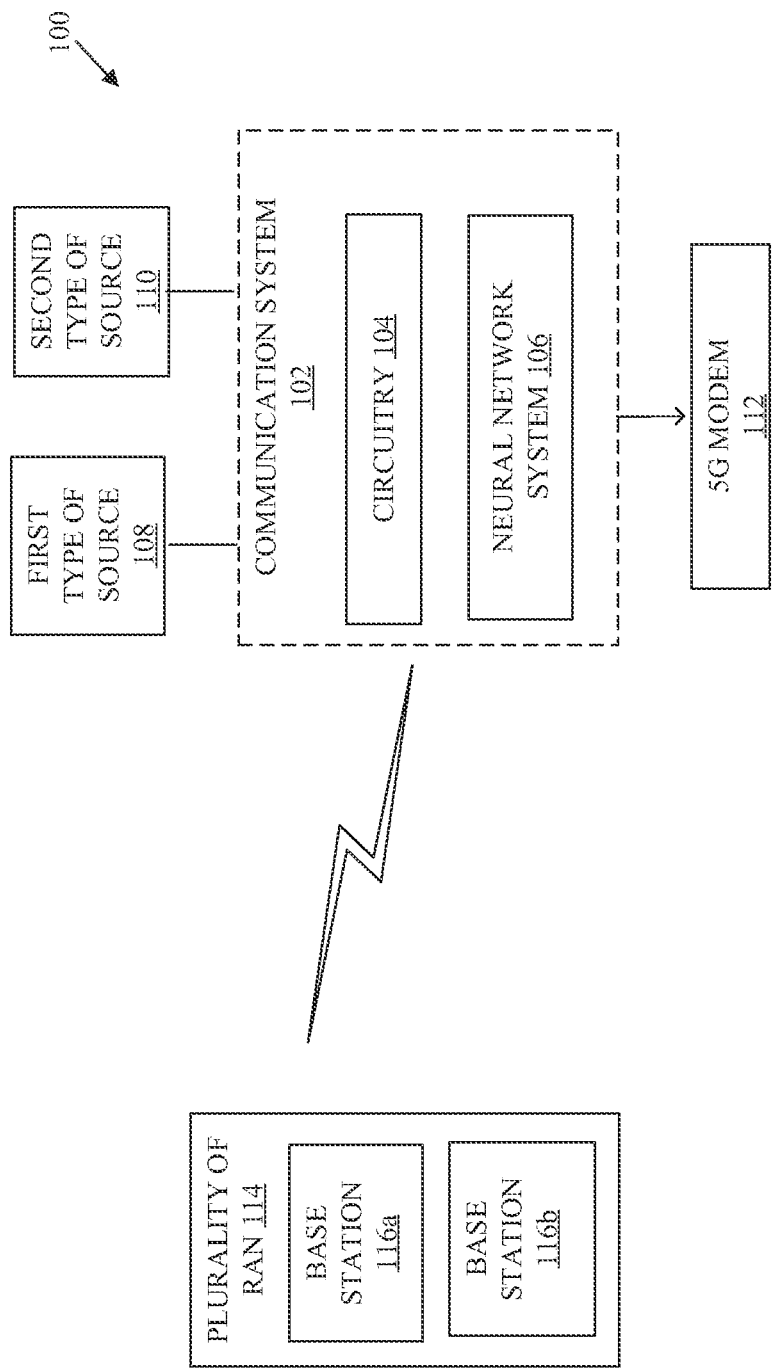
FIG. 1 is a network environment diagram that illustrates an exemplary communication system for high sensitivity 5th generation (5G) signals detection using a neural network, in accordance with an exemplary embodiment of the disclosure.

Certain embodiments of the disclosure may be found in a communication system and method for high sensitivity 5G signals detection using a neural network. Traditional methods of developing 5G modems are costly and require immense time (e.g. about 6 months to a year) in development a conventional 5G wireless modem or even a partial 5G modem. Based on the trained neural network system of the disclosed communication system, an advanced 5G modem may be developed at significantly reduced time and cost. For example, the disclosed communication system enables development of highly sensitive 5G modem (having additional function of demodulator) in about a week or less time. Typically, a wireless modem is a network hardware device that modulates one or more carrier wave signals to encode digital information transmission.

In accordance with an embodiment, the trained neural network system of the disclosed communication system may be implemented within a system on a chip (Soc) and is highly sensitive (accuracy above 99%) to 5G signals even in the presence of various radio frequency impairments and various environmental conditions, such as multipath interference. In an implementation, the disclosed communication system after the training of the neural network system acts and functions as a miniature system (which is implementable as a miniature 5G modem chip) that is capable to perform entirely or partially the functionality of a modern 5G modem, including 5G signal detection, synchronization, channel estimation, equalization, demodulation, decoding, etc.

Moreover, it is known that SoCs generate a huge amount of heat, especially when a communication device, such as a user equipment is involved in complex computational task (e.g. gaming sessions or heavy download/upload sessions as expected in 5G communication). Thus, heat is one of the issues that has been reported in a conventional 5G modem. Currently, 5G chip architecture requires a main chip having 4G long term evolution (LTE) functionalities along with a separate chip for the 5G mmWave modem and several more chips for the mmWave antenna modules, which results in large hardware size and the heating issues as compared to 4G only modem chip. The excessive heating may also temporality switch-off the 5G modem and switch back the 4G modem, thereby reducing data rates.

Compared with existing 5G modems or 5G design implemented as SoCs, the disclosed communication system is cost-effective and easy-to-use because of the ability to quickly develop new 5G modems for deployments on a massive scale with lower operating cost. The high radio frequencies, such as the 5G NR, may demonstrate high transmittance losses when propagating through typical signal-obstructing physical objects or materials, such as tinted glass, wood, drywall, other glasses etc., when compared to sub-6 GHz radio signals. This may be a constraint for consistent availability of 5G NR connections, anywhere and anytime that may be desirable. The disclosed communication system may also act as a repeater device or a relay node that that not only mitigates, for example, the aforementioned challenges, but also provides a low-power, low-latency, low-heating solution for highly sensitive 5G signals detection, modulation, and demodulation. In the following description, reference is made to the accompanying drawings, which form a part hereof, and in which is shown, by way of illustration, various embodiments of the present disclosure.

FIG. 1 is a network environment diagram that illustrates an exemplary communication system for high sensitivity 5th generation (5G) signals detection using a neural network, in accordance with an exemplary embodiment of the disclosure. With reference to FIG. 1, there is shown a network environment diagram 100 that may include a communication system 102. The communication system 102 may include circuitry 104 and a neural network system 106. There is further shown a first type of source 108, a second type of source 110, a 5G modem 112, and a plurality of radio access nodes (RAN) 114. The plurality of RAN may include base stations 116a and 116b.

The communication system 102 may be a new radio (NR) enabled user equipment (UE), a NR enabled repeater device, or a part of the NR enabled UE, or the NR enabled repeater device. The communication system 102 may support an evolved-universal terrestrial radio access (E-UTRA)-new radio (NR) dual connectivity (EN-DC) (also referred to as LTE/NR dual connectivity. In accordance with an embodiment, the communication system 102 may support multiple and a wide range of frequency spectrum, such as 3G, 4G, or 5G NR. For 5G NR, there may be two NR frequency Ranges (frequency range 1 and 2) that may be utilized for practical implementations. Frequency range 1 may overlap and extend 4G LTE frequencies, operating from 450 MHz to 6,000 MHz, which is also commonly referred to as NR or sub-6 gigahertz (GHz). Frequency range 2 operates at a much higher about 24 GHz to 52 GHz, which is commonly also referred to as millimeter wave (mmWave), although 'millimeter' frequency length typically begins at 30 GHz.

The communication system 102 may comprise suitable logic, circuitry, and interfaces that may be configured to train the neural network system 106 such that the trained neural network system 106 is able to detect and classify 5G signals from non-5G signals with high sensitivity and accuracy, such as 99% to 99.999% (or even 100% after a period of time) 5G signal detection accuracy. In a case where the communication system 102 is implemented as a repeater device, the communication system 102 may be positioned in a vicinity of a signal-obstructing physical object, which may partially block the path of the input RF signals from the base stations 116a and 116b, so as to facilitate communication between at least one base station and one or more UEs. In a case where the communication system 102 is implemented as a part of UE (such as a 5G-enabled smartphone), the communication system 102 may act as a 5G modem chip, such as the 5G modem 112, after the neural network system 106 is trained. The communication system 102 may be coupled to (or may be realized by) various components, such as RF front-end (transmitter front-ends and receiver front-ends), a digital signal processor, a plurality of low-noise amplifiers, a plurality of phase shifters, a plurality of power combiners, a plurality of power dividers, and a plurality of power amplifiers, logical control units, a combination of functionalities of 4G and 5G modems, a phased lock loop (PLL) circuits, and mixers.

The circuitry 104 may be configured to acquire a plurality of 5G RF signals originated from the first type of source 108 and the second type of source 110 for training purposes of the neural network system 106. The communication system 102 may be a programmable device, where the circuitry 104 may execute instructions stored in a memory of the communication system 102. Example of the implementation of the circuitry 104 may include, but are not limited to a system on a chip (Soc) processor, an embedded processor, a microcontroller, a specialized DSP, a Reduced Instruction Set Computing (RISC) processor, an Application-Specific Integrated Circuit (ASIC) processor, and/or other processors.

The neural network system 106 includes suitable circuitry, interfaces, and/or logic configured to learn from training examples of radio frequency (RF) signals. The neural network system 106 may be further configured to find a relationship between an input 5G RF signal (i.e. input object) and an output object (i.e. demodulated 5G RF signal). The neural network system 106 may be a deep learning network. After neural network system 106 is trained, the trained neural network system 106 is then deployed in a wireless modem so that the modem may function as the 5G modem 112. The deployed pre-trained neural network system 106 is remotely updatable as and when required. In a first implementation, the neural network system 106 may employ a supervised learning model. In a second implementation, the neural network system 106 may employ a semi-supervised learning model. In a third implementation, the neural network system 106 may employ unsupervised or reinforcement machine learning algorithms for operation thereof. Typically, the machine learning algorithms refer to a category of algorithms employed by a system that allows the system to become more accurate in predicting outcomes and/or performing tasks, without being explicitly programmed.

In accordance with an embodiment, the neural network system 106 may be implemented on a field-programmable gate array (FPGA) or an Application-Specific Integrated Circuit (ASIC) to process and classify RF signals as 5G signals or non-5G signals in real-time or near real-time. In another implementation, the neural network system 106 may be executed on central processing unit (CPU) to post-process a captured RF signal. In an implementation, the neural network system 106 comprises a plurality of convolutional neural networks (CNN) layers followed by a Softmax layer. The CNN layers employ a deep learning approach, which takes an input data, assign parameters (e.g. learnable weights and biases) to various characteristics/features of 5G signals in the input data to be able to differentiate one type of input from other (e.g. a 5G signal from other type of signals like 4G, 3G, and the like). The softmax layer may be the final layer which limit or consolidates the output of the network system 106 into the range, for example, 0 to 1 as probability, and thus for example, 1 may indicate a highest probability that the input signal is a 5G signal. In an example, the softmax layer allows the neural network system 106 to run a multi-class function to detect probability of 5G signals as well as new impairments in the 5G signal (in some cases presence of other type of signals may be classified).

In another implementation, the neural network system 106 comprises a combination of a plurality of convolutional neural networks (CNN) layers and a plurality of long short-term memory (LSTM) layers followed by Softmax layer. The LSTM layer may be a recurrent unit which remembers (stores) past knowledge (e.g. 5G signal patterns or characteristics) that the neural network system 106 has processed in each training cycle and to forget (i.e. discard) irrelevant data. This is executed by use of gates and a vector, which describes the information that was retained by the previous LSTM recurrent unit (or layer). In yet another implementation, the neural network system 106 comprises a combination of a plurality of convolutional neural networks (CNN) layers and a plurality of gated recurrent units (GRU) layers followed by Softmax layer. The GRU layer is similar to LSTM but has comparatively less parameters since it lacks one gate than the LSTM layer, which means the training speed by use of GRU is faster than LSTM without any compromise on results or effect.

The first type of source 108 refers to a software application. For example, MATLAB software (e.g. 5G Toolbox™), or other 5G signal generation and analysis software may be used to artificially generate a plurality of 5G signals. The term 5G signals refers to and covers both NR frequency ranges (i.e. aforementioned frequency range 1 and 2) that may be utilized for practical implementations. In order to train the neural network system 106, the software application may be executed to generate 5G RF waveforms including 5G NR downlink waveforms and 5G NR uplink waveforms as per specified settings and configurations. In an implementation, two software applications or a customized software application may be used that supports output of 5G signals in the frequency band below 6 GHz (sub-6 GHz) as well as above 24 GHz (mmWave spectrums). The generated plurality of 5G signals used for training of the neural network system 106 may be compliant to 3rd generation partnership project (3GPP) specification for 5G NR. Different settings or configurations may be used to generate different signal characteristics representative of 5G signals. For example, different permutations and combinations of channel bandwidth, frequency range, subcarrier spacing, number of resource blocks in a 5G NR carrier signal may be used to generate wide range of representative 5G signals for comprehensive training of the neural network system 106.

The second type of source 110 refers to a telecommunication hardware that is configured to capture over-the-air 5G signals. Examples of the second type of source 110 include, but are not limited to probe antennas, test RF instruments, software-defined radio hardware, that are configured to transmit 5G waveforms and capture live over-the-air 5G RF signals.

The 5G modem 112 may refer to a new 5G modem developed based on the trained neural network system 106. In an implementation, the 5G modem 112 may be implemented as a single 5G modem chip that may be integrated in a UE, such as a smartphone, or an active repeater device. The 5G modem 112 may be communicatively coupled to radio frequency front-end circuitry (or chip; not shown) to receive, process, and transmit 5G signals. The 5G modem 112 may be a system on a chip (Soc), which is highly sensitive (accuracy above 99%) to 5G signals even in the presence of various RF impairments and various environmental conditions, such as multipath interference. In other words, the neural network system 106 implemented within the Soc may be trained to perform all operations or partially some specified functions (e.g. time offset and frequency offset synchronization) of a modern 5G modem, including 5G signal detection, synchronization, channel estimation, equalization, demodulation, decoding, etc.

The plurality of RAN 114 may include the base stations 116a and 116b, and other network nodes, such as preinstalled active repeater devices. In an implementation, the base station 116a may be a master node (an eNB that acts as a MeNB) and the base station 116b (i.e., the gNB or the 5G NR-enabled base station) may operate as a secondary node. In another implementation, both the base stations 116a and 116b may be a gNB (i.e. a 5G enabled base station). Typically, bandwidth requirements serve as a guideline for a location of a base station based on a relative distance between the one or more remote UEs and the base stations 116a and 116b. The count of base stations may be dependent on, for example, population density and environmental conditions, such as geographic irregularities, which includes, for example, buildings and mountain ranges, which may interfere with beams of RF signals.

In operation, there may be a training phase and an operational phase of the communication system 102. In the training phase, the neural network system 106 may be configured to learn from training examples of radio frequency (RF) signals. The training of the neural network system 106 uses training examples (e.g. training data) as input, and such training examples refers to output of analog to digital (ADC) converters (i.e. ADC samples) of the RF signals. In an implementation, each training example may be a pair of records that includes an input RF signal in digital domain (e.g. ADC sample) and a desired output value, such as at least one signal characteristic of a plurality of signal characteristic of a 5G signal. The pair of records may be segregated into two classes, a match class (M) and an unmatch class (U). The match class (M) refers to those pairs of records (training examples) where the output signal (or value) from the neural network system 106 is correctly identified by the neural network system 106 as expected or matched (i.e. accurate), i.e. a 5G signal, when the input RF signal in digital domain is fed to the neural network system 106. In order to train the neural network system 106, the circuitry 104 may be configured to artificially generate a plurality of 5G signals (e.g. in digital domain) by use of the first type of source 108. In an implementation, the first type of source 108 is a software application. The software application may be executed to generate 5G RF signals. In another implementation, in order to train the neural network system 106, the circuitry 104 may be configured to artificially generate a plurality of 5G signals by use of both the first type of source 108 and the second type of source 110.

The circuitry 104 may be configured to label a first set of 5G RF signals that originate from the first type of source 108 and a second set of 5G RF signals that originate from the second type of source 110. The first set of 5G RF signals are software application-generated 5G RF signals with known labels, and the second set of 5G RF signals are 5G RF signals captured over-the-air (OTA) from one or more 5G RANs, such as the plurality of RAN 114. In other words, the neural network system 106 may be trained on both software-generated 5G signals with known labels and also with the signals that are captured over the air from actual base stations and using real hardware (such as the second type of source 110). For example, both software-generated 5G signals with known labels and also with the signals that are captured over the air from actual base stations used in training are training examples in digital domain (e.g. ADC samples). In an implementation, the first set of 5G RF signals and the second set of 5G RF signals are the matched training examples (i.e. M examples that belongs to the pair of records of match class), which are used to train the neural network system 106 to detect and classify 5G signals. The unmatched training examples from the plurality of 5G signals may be discarded.

The circuitry 104 may be configured to add at least one RF impairment randomly to each labelled example of the first set of 5G RF signals and the second set of 5G RF signals. The randomization of artificially added RF impairment to each labeled example corresponds to addition of different RF impairments randomly to different labeled examples. A plurality of RF impairments may be artificially generated and added to a specified 5G RF signal. Examples of the plurality of RF impairments may include, but is not limited to non-linear distortion (e.g. amplifier non-linearities), multipath fading (or multipath interference), inter-symbol interference, thermal noise, carrier leakage, or other signal noise. In an exemplary implementation, the circuitry 104 may be configured to generate random data to mimic the plurality of RF impairments (or distortions). In an example, the circuitry 104 may be configured to execute the software application to generate the random data by use of parameterized models (e.g. a system model or a simulation model) that match (or is approximately same) with actual measurements of RF impairments of RF signals that are captured over-the-air. The parameters of the parameterized models may be changed automatically (or partially user-assisted) and randomly, for example, to adjust levels (or values) of RF impairments. For example, magnitude or strength of signals, such as varying signal to noise ratio (SNR), or variable and random generation of different levels of non-linear distortion, multipath fading, inter-symbol interference, thermal noise, carrier leakage, different signal noise to mimic actual measurements of RF impairments detected and analyzed from over the air captured RF signals. In some implementation, actual RF signals (e.g. 5G signals or 4G signals in some cases) that contain such RF impairments and distortions, are captured and the measurements is performed for the RF impairments. Thereafter, such values or levels of RF impairments are mimicked by use of the parameterized models, and different levels or values of different RF impairments are then introduced randomly to the first set of 5G RF signals and the second set of 5G RF signals. Beneficially, the randomization of artificially added RF impairment to each labeled example in the training phase significantly improves the detection and classification accuracy of the neural network system 106 for even unknown and new RF impairments in the operational phase, thereby increasing the sensitivity of the communication system to above 99%, preferably between 99.5 to 99.999% in 5G signal detection and demodulation as well as improving the performance of the communication system 102 in terms low-power consumption and low heat dissipation at the time of processing of 5G RF signals to provide 5G data speeds.

Typically, the transmitted signals, for example, from a base station, undergoes several refractions and reflections by various surrounding obstacles, which causes the multipath propagation nature of RF impairments, such as multipath interference. In an example, typically, in a conventional transceiver, power amplifiers (PAs) are used to compensate for signal propagation loss. However, a PA may also distort the RF signal (also known as amplifier non-linearities), thereby causing intermodulation noise. Moreover, it is known that 5G cellular network are most susceptible to multipath fading, and it is usually difficult to identify modulation schemes correctly in the multipath fading environment.

The circuitry 104 may be further configured to train the neural network system 106 with a plurality of labelled examples. Each labelled example of the plurality of labelled examples may include an artificially added RF impairment. The plurality of labelled examples includes the first set of 5G RF signals and the second set of 5G RF signals which are labelled with annotations that indicate at least a signal characteristic of a 5G signal and artificially added impairments. The labelled examples that are data input for the neural network system 106 are the ADC samples in digital domain. The neural network system 106 may be configured to learn signal characteristics, such as waveforms characteristic of 5G signals, to map (i.e. find relationship) between each input-output pair (i.e. input 5G RF signal characteristics (vector signal) and expected output value) of each labelled example of the plurality of labelled examples. For example, different permutations and combinations of channel bandwidth, frequency range, subcarrier spacing, number of resource blocks which are characteristic of a 5G NR carrier signal in the labeled examples may be used as features by the neural network system 106 for learning 5G signal characteristics. The neural network system 106 uses the plurality of labeled examples (i.e. the first set of 5G RF signals and the second set of 5G RF signals with artificially added impairments) as the training data to adjust initially set parameters in the neural network system 106 such that the neural network system 106 generates same or similar output as per the label for each training sample (i.e. a desired output value is outputted that indicates a 5G signal characteristic). After each training cycle of a plurality of training cycles, the neural network system 106 is evaluated with validation data (known input sample) to check if the output result (value) from the neural network system 106 meets defined criteria (i.e. if it has provided satisfactory results). In a case where the defined criteria (e.g. accuracy above 99%) is met, the neural network system 106 may be considered as trained. In accordance with an embodiment, the circuitry 104 may be further configured to train the neural network system 106 to perform channel equalization in presence of noise. Equalization refers to a process of removal of inter-symbol interference and other noise from the channel, from the received RF signal at the receiver side of a front-end RF circuitry.

The circuitry 104 may be configured to use the trained neural network system 106 to detect an input 5G RF signal having a new RF impairment. In other words, the circuitry 104 detects an input 5G RF signal having a new RF impairment based on the trained neural network system 106. Beneficially, as a result of the training of the neural network system 106 from both software-generated 5G signals with known labels and with the signals that are captured over the air from actual base stations and using real hardware (such as the second type of source 110), the trained neural network system 106 is able to accurately detect 5G RF signal which may have a new RF impairment even at low SNR (e.g. less than 2 decibels (db) or even at zero or negative db). Moreover, the randomization of artificially added RF impairment to each labeled example in the training phase significantly improves the detection and classification accuracy of the neural network system 106 to detect and classify 5G signals and non-5G signals even if unknown and new RF impairments are present in the input 5G RF signal when fed to the trained neural network system 106, thereby improving the performance of the communication system 102.

The circuitry 104 may be further configured to decode synchronization signals from 5G new radio (NR) synchronization signal (SS) burst that includes a plurality of synchronization signal blocks (SSBs). The synchronization signals, such as primary synchronization signal (PSS) and secondary synchronization signal (SSS), may be decoded based on the trained neural network system 106. The 5G NR SS burst is transmitted by use of one or more directional beams by a base station (such as the base station 116*b*) and captured by the communication system 102 to decode the synchronization signals based on the trained neural network system 106 for time-frequency synchronization.

Typically, a 5G NR-enabled base station, such as the base stations 116*a* and 116*b* periodically transmit SSBs carrying synchronization signals (e.g. PSS, secondary synchronization signal (SSS)) and broadcast channels (PBCH) by use of beam sweeping. Generally, one SS block may include 1 symbol PSS, 1 symbol SS and 2 symbols PBCH. SS burst (or the radio burst) may carry one or multiple SSBs. Typically, a combination of PSS and SSS helps to identify about 1008 physical cell identity (PCI) for a geographical area. The trained neural network system 106 may be configured to recognize the PSS and SSS from the plurality of SSBs transmitted in one or more directional beams. The RF front end circuitry (such as a Rx phased array and a Tx phased array) may receive one or more beams of input 5G RF signals and transmit the one or more beams of output 5G RF signals in accordance with multiple-input multiple-output (MIMO) reception and transmission.

Before the actual channel estimation starts, the synchronization signals, such as primary synchronization signal (PSS) and secondary synchronization signal (SSS), may be decoded based on the trained neural network system 106 for time-frequency synchronization. Moreover, the time-frequency offsets also cause inter-symbol interference, which in turn results in lower value of Signal to Noise Ratio (SNR). Moreover, the timing offset degrades system performance by introducing ISI and destroying orthogonality between sub-carriers. Thus, based on the trained neural network system 106, the circuitry 104 may be configured to tune the communication system 102 (e.g. a phased locked loop of the communication system 102) to radio burst of SSB at each SSB location (i.e., each carrier frequency) of a plurality of carrier frequencies (i.e., SSB frequencies) for PSS search, based on the received information of the plurality of SSBs. The circuitry 104 may be configured to instruct the radio signal reception to tune to the carrier frequency offset. The plurality of carrier frequencies may include one or multiple 5G NR carriers. Based on the trained neural network system 106, the circuitry 104 may be configured to search for SSBs for the carrier information. Each SSB location indicates a carrier frequency offset. The circuitry 104 may be further configured to align a timing offset of the beam reception to a frame structure of a 5G NR radio frame based on the detected PSS for the at least one SSB location (e.g., a 5G NR carrier frequency). The detected PSS by the trained neural network system 106 indicates a timing boundary of the 5G NR radio frame, and thus having the detected PSS can also align 5G signal reception/transmission of the communication system 102 with the frame structure of the 5G NR radio frame for time-frequency synchronization. In accordance with an embodiment, the circuitry 104 may be further configured to extract physical cell identity (PCI) of a serving base station (e.g. the base station 116*b*) from the detected 5G RF signal based on the trained neural network system 106.

In accordance with an embodiment, the circuitry 104 may be further configured to extract master information block (MIB) based on the trained neural network system 106. The MIB includes broadcast system information that is periodically transmitted by a base station. In case of 5G NR, MIB or system information block may be transmitted on demand, i.e. when a request is received from a UE, such as the communication system 102. Based on the detected and decoded synchronization signals and extraction of the PCI of the serving base station, the circuitry 104 may be configured to also extract the MIB, which is QPSK modulated, to acquire bandwidth, antenna configuration, and system frame number associated with input 5G RF signal. The MIB extracted is transmitted on OFDM symbol 1, 2, 3.

In accordance with an embodiment, the circuitry 104 may be further configured to extract beam identifier (ID) of a beam of 5G RF signal having a highest Received Signal Strength Indicator (RSSI) among a plurality of RSSI associated with a plurality of beams of 5G RF signals. The beam ID may be extracted based on the trained neural network system 106. Based on the detected and decoded synchronization signals, the trained neural network system 106 may descramble or demodulate the beam of 5G RF signal having the highest RSSI to extract the beam ID. In an implementation, the circuitry 104 may be further configured to execute a beam measurement and ranking operation for a plurality of different beams of RF signals that are received at the communication system 102. In the beam measurement and ranking operation, the received plurality of different beams of RF signals are sorted in terms of received signal strength indicator (RSSI) measurement associated with each beam of the received plurality of different beams of RF signals. In an example, in the beam measurement and ranking operation, firstly, the circuitry 104 may be configured to measure RSSI for each beam of the plurality of different beams of RF signals for each SSB location of the plurality of SSB locations in accordance with PSS timing after the PSS is detected. Secondly, the circuitry 104 may be further configured to sort the received plurality of different beams of RF signals based on the measured received signal strength for each beam of the plurality of different beams. The circuitry 104 may be further configured to switch to a specific beam of RF signals in the 5G NR frequency that has a highest RSSI of the received plurality of different beams. The circuitry 104 may be further configured to execute a beam lock for the beam of 5G RF signal having the highest RSSI in the NR carrier frequency, and thus the beam ID then may be easily extracted.

In accordance with an embodiment, the circuitry 104 may be further configured to decode a physical downlink shared channel (PDSCH) used for downlink data transmission from the detected 5G RF signal based on the trained neural network system 106. The decoding of the PDSCH signal may be executed based on the trained neural network system 106. In 5G NR, the neural network system 106 learns (during training phase) signal characteristics of PDSCH demodulation reference signal (DMRS), which is a physical layer signal that is used to decode the PDSCH. Thus, in an implementation, the neural network system 106 may be configured to decode the PDSCH based on the detected DMRS.

In accordance with an embodiment, the circuitry 104 may be further configured to decode a physical uplink shared channel (PUSCH) used for uplink data transmission from the detected 5G RF signal based on the trained neural network system 106. Based on the downlink control information (DCI) or DCI formats learned by the trained neural network system 106, the trained neural network system 106 facilitates transmission of PUSCH. The trained neural network system 106 may be configured to determine a start symbol and length in symbols for each mapping type (e.g. PUSCH mapping types) that is compliant to 3GPP for PUSCH transmission.

In accordance with an embodiment, the circuitry 104 may be further configured to decode a plurality of error-correction codes from the detected 5G RF signal based on the trained neural network system 106. In the training phase, the circuitry 104 may be configured to train the neural network system 106 to detect and decode the plurality of error-correction codes used in 5G NR signals, such as polar codes and the low-density parity-check (LDPC) codes. LDPC may be used in data channels (e.g. Enhanced Mobile Broadband (eMBB) data channels) for 5G NR and polar codes may be used for corresponding control channel. For example, typically, in 5G NR communication, polar codes are used to encode the uplink control information (UCI) over the PUCCH and the PUSCH, and also encode downlink control information (DCI) and the payload in the physical broadcast channel (PBCH) in downlink. The neural network system 106 may be configured to learn such polar codes so that in the operational phase, such polar codes are decoded with high accuracy. Thus, the neural network system 106 is adaptable and dynamic to learn characteristics of even a new coding scheme or error-correction codes used in 5G signals in order to effectively detect and decode corresponding coding scheme or error-correction codes when in operation.

In accordance with an embodiment, the circuitry 104 may be further configured to demodulate the detected 5G RF signal having the new RF impairment based on the trained neural network system 106. The detected 5G RF signal having the new RF impairment may be demodulated based on the trained neural network system 106. In an example, the cyclic prefix (CP) orthogonal frequency-division multiplexing (OFDM) may be demodulated to recover data streams from 5G RF signal by use of the trained neural network 106. The circuitry 104 may be further configured to perform CP-OFDM. Beneficially, as a result of the training of the neural network system 106 from both software-generated 5G signals with known labels and with the signals that are captured over the air from actual base stations and using real hardware (such as the second type of source 110), the trained neural network system 106 accurately demodulates the detected 5G RF signal which may have a new RF impairment even at low SNR. The randomization of artificially added RF impairment to each labeled example in the training phase significantly improves the detection and classification accuracy of the neural network system 106 for even unknown and new RF impairments not encountered even in training, thereby improving the performance of the communication system 102.

In accordance with an embodiment, the circuitry 104 may be further configured to classify modulation associated with the detected 5G RF signal based on the trained neural network system 106. In the training phase, the neural network system 106 may be configured to learn waveforms that corresponds to OFDM signal from the labelled examples, which have artificially and randomly added RF impairments therein. In an implementation, waveforms of other modulation schemes such as filter bank multi-carrier (FBMC), universal filtered multi-carrier modulation (UFMC), generalized frequency division multiplexing (GFDM), may be learned. Thus, during operational phase, the trained neural network system 106 enables highly sensitive and accurate (i.e. accuracy greater than or equal to 99%) classification of modulation scheme associated with the detected 5G RF signal.

In accordance with an embodiment, the circuitry 104 may be further configured to utilize the trained neural network system 106 to execute a plurality of functionalities of a fifth generation (5G) modem. Existing methods of developing 5G modems are costly and immense time (e.g. about 6 months to a year) is usually required in development a conventional 5G wireless modem or even a partial 5G modem. Based on the trained neural network system 106, an advanced 5G modem (having additional function of demodulator) may be developed significantly in reduced time and cost. The trained neural network system 106 and the circuitry 104 may be implemented within a system on a chip (Soc) and is highly sensitive (accuracy above 99%) to 5G signals even in the presence of various RF impairments and various environmental conditions, such as multipath interference. In other words, the neural network system 106 may be trained to perform all operations or partially some specified functions (e.g. time offset and frequency offset synchronization) of a modern 5G modem, including 5G signal detection, synchronization, channel estimation, equalization, demodulation, decoding, etc.

In accordance with an embodiment, the circuitry 104 may be further configured to detect an order of modulation of a physical downlink shared channel (PDSCH) and a physical uplink shared channel (PUSCH) from the detected 5G RF signal based on the trained neural network system 106 independent of decoding of data from the 5G RF signal. Generally, the modulation order of a modulation scheme indicates a number of the different symbols that are transmitted using a particular modulation scheme. Data that is to be transmitted may be converted in the form of bits, before transmission of such bits over-the-air using radio waves by manipulation of one or more signal characteristic, such as amplitude, frequency, and/or phase, of each radio wave. Modulation schemes indicate the signal characteristic that are manipulated. Higher order modulation schemes, such as 16QAM, 64QAM, allow more information to be packed into a single radio wave, which improves spectral efficiency of 5G communication. For example, the modulation scheme quadrature phase shift keying (QPSK) has a modulation order of "2", Quadrature amplitude modulations, such as 16 QAM have modulation order of "4", 64 QAM have modulation order of "6", 256 QAM have modulation of "8". In an example, 64 QAM indicates that one single radio wave allows to represent six bits of data by manipulating the amplitude and phase of the radio wave into one of 64 different discrete and measurable states. Although the higher order modulation schemes allow transmission of more bits per radio wave, they are more susceptible to RF impairments as more discrete phases and amplitudes of a signal needs to be detected. Thus, the selection of an optimal modulation scheme improves communication performance and finding correct order of modulation of PDSCH and PUSCH simplifies the demodulation accuracy of the communication system 102.

Figure 2:
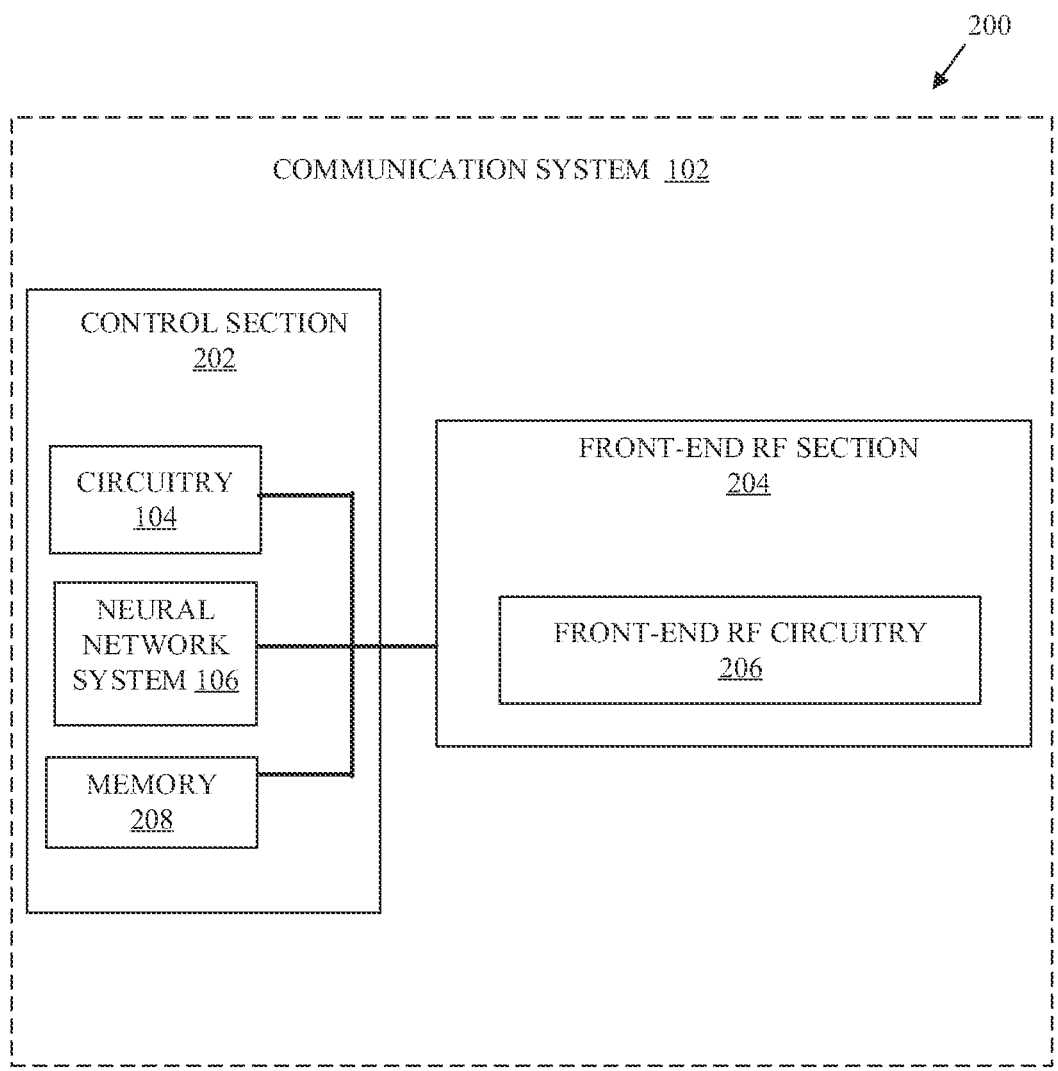
FIG. 2 is a block diagram illustrating various components of an exemplary communication system for high sensitivity 5G signals detection using a neural network, in accordance with an exemplary embodiment of the disclosure.

FIG. 2 is a block diagram illustrating various components of an exemplary communication system for high sensitivity 5G signals detection using a neural network, in accordance with an exemplary embodiment of the disclosure. FIG. 2 is explained in conjunction with elements from FIG. 1. With reference to FIG. 2, there is shown a block diagram 200 of the communication system 102. The communication system 102 may include a control section 202 and a front-end radio frequency (RF) section 204. The control section 202 may include the circuitry 104, the neural network system 106, and the memory 208. The control section 202 may be communicatively coupled to the front-end RF section 204. The front-end RF section 204 may include front-end RF circuitry 206. The front-end RF circuitry 206 may further include a front-end receiver circuit, such as a receiver (Rx) phased array, and a front-end transmitter circuit, such as a transmitter (Tx) phased array, an analog to digital converter (ADC), and a digital to analog (DAC) converter.

The front-end RF circuitry 206 may include a Rx phased array and a Tx phased array. The Rx phased array may be configured to receive a plurality of different beams of RF signals from a plurality of different directions. The circuitry 104 may be configured to control radio signals reception at the Rx phased array. In accordance with an embodiment, the Rx phased array may include a cascading receiver chain comprising various components (e.g., an antenna array, a set of low noise amplifiers (LNA), a set of receiver front end phase shifters, and a set of power combiners) for the beam reception (not shown for brevity). Similarly, the TX phased array may include a cascading transmitter chain comprising various components, such as a set of power dividers, a set of transmitter front end phase shifters, a set of power amplifiers (PA), and antenna array for beam transmission (not shown for brevity). In accordance with an embodiment, front-end RF circuitry 206 may receive one or more beams of input RF signals and transmit the one or more beams of output RF signals in accordance with multiple-input multiple-output (MIMO) reception and transmission. In some embodiments, the tuning of the PLL (described in FIG. 1) may synchronize down conversion of received RF signals to the radio burst of SSB for each carrier frequency. Another PLL may be provided in the communication system 102, which acts a local oscillator and may be associated with the Tx phased array to facilitate up conversion of input baseband signals before transmission.

The memory 208 may include suitable logic, circuitry, and/or interfaces that may be configured to store instructions executable by the circuitry 104. The memory 208 may be further configured to store decoded physical cell identities (PCIs) of one or more beams that has the highest received signal strength or received signal strength greater than the threshold signal strength value. Examples of implementation of the memory 208 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 202 may further include one or more other components, such as analog to digital converters (ADCs), digital to analog circuitry (DAC), a LTE modem, and the like, known in the art, which are omitted for brevity.

Figure 3A:
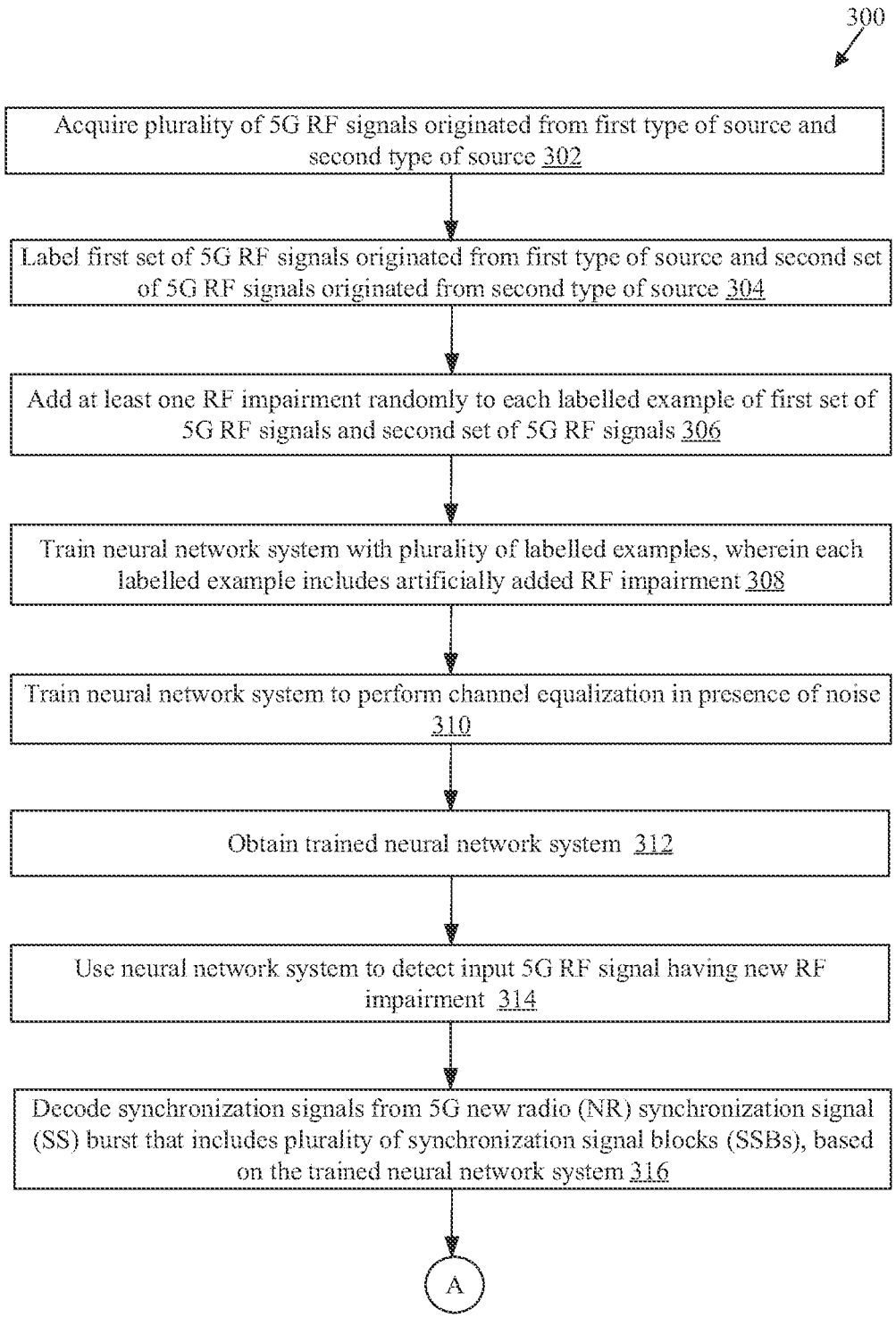
FIGS. 3A, 3B, and 3C collectively, is a flow chart that illustrates an exemplary method for high sensitivity 5G signals detection and demodulation using a neural network, in accordance with an embodiment of the disclosure.
Figure 3B:
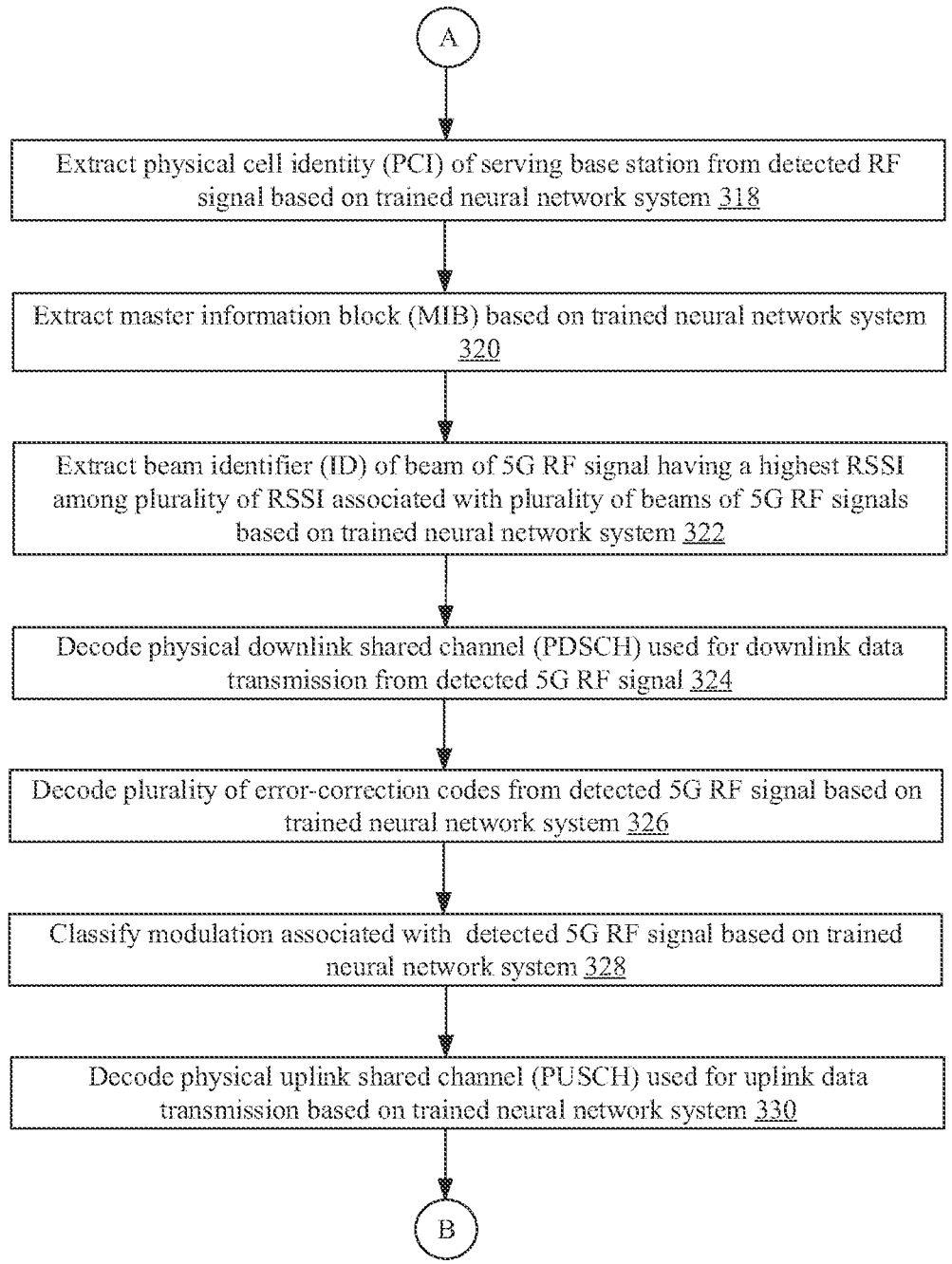
Figure 3C:
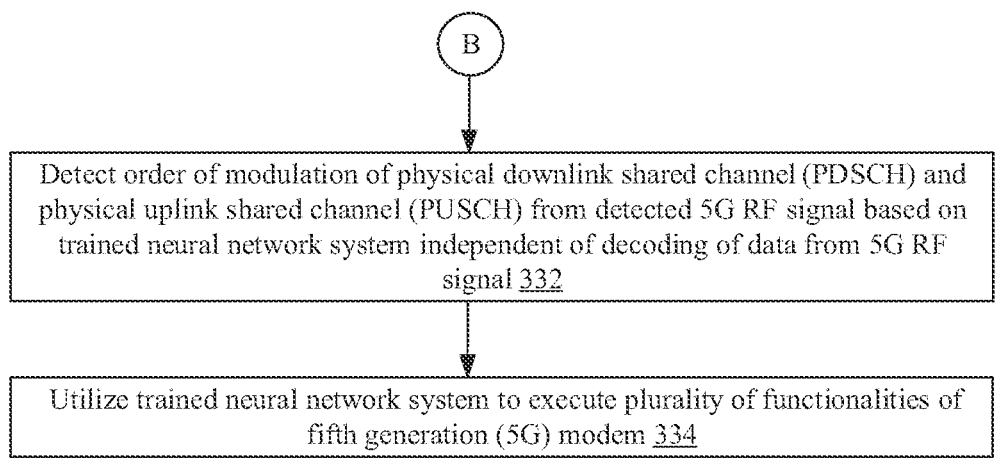

FIGS. 3A, 3B, and 3C collectively, is a flow chart that illustrates an exemplary method for high sensitivity 5G signals detection and demodulation using a neural network, in accordance with an embodiment of the disclosure. FIGS. 3A, 3B, and 3C are explained in conjunction with elements from FIGS. 1 and 2. With reference to FIGS. 3A to 3C, there is shown a flow chart 300 comprising exemplary operations 302 through 334 by the communication system 102.

At 302, a plurality of 5G RF signals originated from the first type of source 108 and the second type of source 110 may be acquired. The circuitry 104 may be configured to acquire the plurality of 5G RF signals and covert them in digital domain (e.g. by use of ADC) for training purposes of the neural network system 106.

At 304, a first set of 5G RF signals originated from the first type of source 108 and the second set of 5G RF signals originated from the second type of source 110 may be labelled. The circuitry 104 may be configured to label the first set of 5G RF signals originated from the first type of source 108 and the second set of 5G RF signals originated from the second type of source 110. The first set of 5G RF signals are software application-generated 5G RF signals with known labels, whereas the second set of 5G RF signals are 5G RF signals captured over-the-air from one or more 5G RANs, such as the plurality of RAN 114.

At 306, at least one RF impairment may be randomly added to each labelled example of the first set of 5G RF signals and the second set of 5G RF signals. The randomization of artificially added RF impairment to each labeled example corresponds to addition of different RF impairments randomly to different labeled examples. The circuitry 104 may be configured to add one or more RF impairments in a randomized manner to each labelled example of the first set of 5G RF signals and the second set of 5G RF signals.

At 308, the neural network system 106 may be trained with a plurality of labelled examples, where each labelled example includes an artificially added RF impairment. The circuitry 104 may be configured to train the neural network system 106 with the plurality of labelled examples.

At 310, the neural network system 106 may be trained to perform channel equalization in the presence of noise. The circuitry 104 may be configured to train the neural network system 106 to perform channel equalization by use of randomization of artificially added RF impairment to each labeled example. The randomization of artificially added RF impairment enables to detect any new or existing RF impairments, to facilitate its removal for channel equalization.

At 312, a trained neural network system 106 may be obtained. After continuous training of the neural network system 106 with the plurality of labelled examples in which each labelled example includes a randomly and artificially added RF impairment, it may be checked whether the classification of the RF signals as 5G signal or non-5G signals have attained a classification accuracy greater a first set threshold, such as 99% or 99.9% signal detection accuracy even when signal to noise ratio (SNR value) is less than a second threshold (i.e. at low SNR value of 1 db or 0 db).

At 314, the trained neural network system 106 may be used to detect an input 5G RF signal having a new RF impairment. The detected 5G RF signal having the new RF impairment may be demodulated. The circuitry 104 may be configured to detect and demodulate a new input 5G RF signal having a new RF impairment.

At 316, synchronization signals may be decoded from 5G new radio (NR) synchronization signal (SS) burst that includes a plurality of synchronization signal blocks (SSBs), based on the trained neural network system 106. The 5G NR SS burst may be transmitted by use of one or more directional beams by a base station (such as the base station 116*b*) and captured by the RF front end circuitry 206 of the communication system 102 to decode the synchronization signals based on the trained neural network system 106 for time-frequency synchronization. The circuitry 104 may be configured to decode the synchronization signals from the 5G NR SS burst.

At 318, physical cell identity (PCI) of a serving base station may be extracted from the detected RF signal based on the trained neural network system 106. The circuitry 104 may be configured to extract (or identify) the physical cell identity (PCI) of the serving base station based on the trained neural network system 106.

At 320, master information block (MIB) may be extracted based on the trained neural network system 106. The MIB may be broadcast system information periodically or on-demand transmitted by a base station (such as the base station 116*b*). The circuitry 104 may be configured to extract the MIB from the broadcast system information.

At 322, beam identifier (ID) of a beam of 5G RF signal having a highest Received Signal Strength Indicator (RSSI)

among a plurality of RSSI associated with a plurality of beams of 5G RF signals, may be extracted based on the trained neural network system 106. The circuitry 104 may be further configured to extract beam ID based on the trained neural network system 106.

At 324, a physical downlink shared channel (PDSCH) used for downlink data transmission may be decoded from the detected 5G RF signal. The circuitry 104 may be further configured to decode the PDSCH used for downlink data transmission.

At 326, a plurality of error-correction codes may be decoded from the detected 5G RF signal based on the trained neural network system 106. The circuitry 104 may be further configured to decode the plurality of error-correction codes from the detected 5G RF signal based on the trained neural network system 106.

At 328, modulation associated with the detected 5G RF signal may be classified based on the trained neural network system 106. The circuitry 104 may be further configured to classify modulation schemes associated with the detected 5G RF signal using the trained neural network system 106.

At 330, a physical uplink shared channel (PUSCH) used for uplink data transmission may be decoded based on the trained neural network system 106. The circuitry 104 may be further configured to decode the PUSCH used for uplink data transmission.

At 332, an order of modulation of a physical downlink shared channel (PDSCH) and a physical uplink shared channel (PUSCH) may be detected from the detected 5G RF signal based on the trained neural network system 106 independent of decoding of data from the 5G RF signal. The circuitry 104 may be further configured to detect (or determine) the modulation order of the PDSCH and PUSCH from the detected 5G RF signal based on the trained neural network system 106 without the need to decode actual data from the 5G RF carrier signal.

At 334, the trained neural network system 106 may be utilized to execute a plurality of functionalities of a fifth generation (5G) modem, such as the 5G modem 112. The circuitry 104 may be further configured to utilize the trained neural network system 106 to execute almost all functionalities of a 5G modem, such as the 5G modem 112.

Various embodiments of the disclosure may provide a non-transitory computer-readable medium having stored thereon, computer implemented instructions that when executed by one or more circuits causes a device to execute operations to learn from training examples of radio frequency (RF) signals, for example, operation as disclosed in FIGS. 3A though 3C. A first set of fifth generation (5G) radio frequency (RF) signals originated from the first type of source 108 and a second set of 5G RF signals originated from the second type of source 110 may be labeled. At least one RF impairment may be randomly added to each labelled example of the first set of 5G RF signals and the second set of 5G RF signals, wherein randomization of artificially added RF impairment to each labeled example corresponds to addition of different RF impairments randomly to different labeled examples. The neural network system 106 may be trained with a plurality of labelled examples, wherein each labelled example includes an artificially added RF impairment. The trained neural network system 106 may be used to detect an input 5G RF signal having a new RF impairment.

Various embodiments of the disclosure may provide a system for high sensitivity 5G signals detection using a neural network (such as the neural network system 106). The system may include the communication system 102 (FIG. 1) that comprises the circuitry 104 (FIG. 1) that may be communicatively coupled to the neural network system 106 (FIG. 1) and the front-end RF circuitry 206 (FIG. 2). The circuitry 104 may be configured to label a first set of 5G RF signals originated from the first type of source 108 and the second set of 5G RF signals originated from the second type of source 110 (FIG. 1). The circuitry 104 may be further configured to add at least one RF impairment randomly to each labelled example of the first set of 5G RF signals and the second set of 5G RF signals, wherein randomization of artificially added RF impairment to each labeled example corresponds to addition of different RF impairments randomly to different labeled examples. The circuitry 104 may be further configured to train the neural network system 106 with a plurality of labelled examples, wherein each labelled example includes an artificially added RF impairment. The circuitry 104 may be further configured to use the trained neural network system 106 to detect an input 5G RF signal having a new RF impairment.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:
1. A communication system, comprising:
   a neural network system configured to learn from training examples of radio frequency (RF) signals; and
   circuitry configured to:

label a first set of fifth generation (5G) radio frequency (RF) signals originated from a first type of source and a second set of 5G RF signals originated from a second type of source;

artificially add at least one RF impairment randomly to each labelled example of the first set of 5G RF signals and the second set of 5G RF signals, wherein randomization of artificially added RF impairment to each labeled example corresponds to addition of different RF impairments randomly to different labeled examples;

train the neural network system with a plurality of labelled examples, wherein each labelled example includes the artificially added RF impairment; and execute a plurality of functionalities of a 5G modem based on the trained neural network system.

2. The communication system according to claim 1, wherein the first set of 5G RF signals are software application-generated 5G RF signals with known labels, and wherein the second set of 5G RF signals are 5G RF signals captured over-the-air (OTA) from one or more 5G radio access nodes (RANs).

3. The communication system according to claim 1, wherein the circuitry is further configured to decode synchronization signals from 5G new radio (NR) synchronization signal (SS) burst that includes a plurality of synchronization signal blocks (SSBs), based on the trained neural network system, wherein the 5G NR SS burst is transmitted by use of one or more directional beams by a base station and captured by the communication system to decode the synchronization signals based on the trained neural network system for time-frequency synchronization.

4. The communication system according to claim 3, wherein the circuitry is further configured to extract master information block (MIB) based on the trained neural network system, wherein the MIB is broadcast system information periodically transmitted by the base station.

5. The communication system according to claim 3, wherein the circuitry is further configured to extract beam identifier (ID) of a beam of 5G RF signal having a highest Received Signal Strength Indicator (RSSI) among a plurality of RSSI associated with a plurality of beams of 5G RF signals, based on the trained neural network system.

6. The communication system according to claim 1, wherein the circuitry is further configured to utilize the trained neural network system to detect an input 5G RF signal having a new RF impairment.

7. The communication system according to claim 6, wherein the circuitry is further configured to extract physical cell identifier (ID) of a serving base station from the input 5G RF signal based on the trained neural network system.

8. The communication system according to claim 6, wherein the circuitry is further configured to:

decode a physical downlink shared channel (PDSCH) used for downlink data transmission from the input 5G RF signal; and decode a physical uplink shared channel (PUSCH) used for uplink data transmission from the input 5G RF signal based on the trained neural network system.

9. The communication system according to claim 6, wherein the circuitry is further configured to demodulate the input 5G RF signal having the new RF impairment based on the trained neural network system.

10. The communication system according to claim 6, wherein the circuitry is further configured to classify modulation associated with the input 5G RF signal based on the trained neural network system.

11. The communication system according to claim 10, wherein the circuitry is further configured to detect an order of modulation of a physical downlink shared channel (PDSCH) and a physical uplink shared channel (PUSCH) from the input 5G RF signal based on the trained neural network system independent of decoding of data from the 5G RF signal.

12. The communication system according to claim 1, wherein the circuitry is further configured to train the neural network system to perform channel equalization in presence of noise.

13. The communication system according to claim 1, wherein the neural network system comprises a plurality of convolutional neural networks (CNN) layers followed by a Softmax layer.

14. The communication system according to claim 1, wherein the neural network system comprises a combination of a plurality of convolutional neural networks (CNN) layers and a plurality of long short-term memory (LSTM) layers followed by Softmax layer.

15. The communication system according to claim 1, wherein the neural network system comprises a combination of a plurality of convolutional neural networks (CNN) layers and a plurality of gated recurrent units (GRU) layers followed by Softmax layer.

16. A method, comprising:

in a communication system that comprises a neural network system and circuitry:

labelling, by the circuitry, a first set of fifth generation (5G) radio frequency (RF) signals originated from a first type of source and a second set of 5G RF signals originated from a second type of source;

artificially adding, by the circuitry, at least one RF impairment randomly to each labelled example of the first set of 5G RF signals and the second set of 5G RF signals, wherein randomization of artificially added RF impairment to each labeled example corresponds to addition of different RF impairments randomly to different labeled examples;

training, by the circuitry, the neural network system with a plurality of labelled examples, wherein each labelled example includes the artificially added RF impairment; and executing a plurality of functionalities of a 5G modem based on the trained neural network system.

17. The method according to claim 16, further comprising decoding, by the circuitry, synchronization signals from 5G new radio (NR) synchronization signal (SS) burst that includes a plurality of synchronization signal blocks (SSBs) based on the trained neural network system, wherein the 5G NR SS burst is transmitted by use of one or more directional beams by a base station and captured by the communication system to decode the synchronization signals based on the trained neural network system for time-frequency synchronization.

18. The method according to claim 16, further comprising extracting physical cell identifier (ID) of a serving base station from an input 5G RF signal based on the trained neural network system.

19. The method according to claim 18, further comprising:

demodulating, by the circuitry, the input 5G RF signal having a new RF impairment; and classifying, by the circuitry, modulation associated with the input 5G RF signal.

20. The method according to claim 19, further comprising demodulating, by the circuitry, an input 5G RF signal having the new RF impairment based on the trained neural network system.

* * * * *